United States Patent [19]

Nakamura et al.

[11] 4,385,163

[45] May 24, 1983

[54] PROCESS FOR PRODUCING PASTE-BLENDING VINYL CHLORIDE RESIN

[75] Inventors: Mamoru Nakamura; Akikatsu Kanayama, both of Takaoka, Japan

[73] Assignee: Nippon Zeon Co. Ltd., Tokyo, Japan

[21] Appl. No.: 304,783

[22] Filed: Sep. 23, 1981

[30] Foreign Application Priority Data

Sep. 26, 1980 [JP] Japan ................................. 55-133809

[51] Int. Cl.$^3$ ................................................ C08F 2/00
[52] U.S. Cl. ..................................... 526/199; 526/83; 526/330; 526/344; 526/345
[58] Field of Search .................................. 526/83, 199

[56] References Cited

U.S. PATENT DOCUMENTS 2,833,754  5/1958  Richards et al. .................. 260/92.8
2,875,186  2/1959  Gerhard et al. ................... 260/92.8
3,766,159  10/1973  Koyanagi et al. ............. 260/92.8 W

FOREIGN PATENT DOCUMENTS 19404  11/1980  European Pat. Off. .

Primary Examiner—Joseph L. Schofer
Assistant Examiner—Bernard Lipman
Attorney, Agent, or Firm—Sherman & Shalloway

[57] ABSTRACT

A process for producing a paste-blending vinyl chloride resin, which comprises initiating suspension polymerization of a vinyl chloride monomer or a mixture of it with a monomer copolymerizable therewith in an aqueous medium in the presence of a water-soluble protein as a suspending agent;

adding a proteolytic enzyme to the polymerization system at any point in a time period running from the time when the polymerization conversion reaches 10% by weight to the time when the polymerization reaction is not yet complete; and thereafter continuing the suspension polymerization until the polymerization reaction is completed.

10 Claims, No Drawings

PROCESS FOR PRODUCING PASTE-BLENDING VINYL CHLORIDE RESIN

This invention relates to a process for producing a paste-blending vinyl chloride resin suitable for preparation of a paste dispersion capable of giving products of excellent quality.

The important properties required of a paste-forming vinyl chloride resin (to be referred to as a paste-forming PVC) are that a paste dispersion (e.g., a plastisol or organosol) prepared by blending the vinyl chloride resin with a plasticizer, diluent, stabilizer, filler etc. should have excellent flowability conducive to the ease of molding under a broad range of shearing forces which it undergoes during processing (for example, from low shearing forces in slush, rotational, dipping, casting and sponge molding operations to high shearing forces in spreading and spray coating) and sufficient flowability even at low plasticizer or diluent concentrations, and its viscosity should vary little with time. Accordingly, when the paste-forming PVC is formed into a paste dispersion, its viscosity properties should be excellent. Specifically, its initial viscosity should be as low as possible, and vary little over a long period of time. Furthermore, the paste-forming PVC should also prove to be excellent in regard to heat stability during processing and the color, transparency and strength of products produced therefrom.

In view of the foregoing, the paste-forming PVC is required to have an average polymer particle size of 0.1 to 5 microns, preferably about 0.2 to 3 microns and be a polydisperse system having a suitable particle size distribution. Furthermore, it should have a low impurity content, and its particle surfaces have suitable affinity for plasticizers.

Generally, a paste-forming vinyl chloride resin having these properties is produced by a method involving adjusting the particle size and particle size distribution of PVC by selecting a suitable emulsifier, using a special method of addition of emulsifier, employing a seed polymerization technique, or by selecting conditions for operating a homogenizer, a dryer and a pulverizer, or a method comprising modifying the particle surfaces of PVC by adding an emulsifier (mainly a nonionic emulsifier) after polymerization. These methods, however, have not proved to be entirely satisfactory with regard to viscosity characteristics.

Frequently, therefore, it is the usual practice to mix coarse particles of a vinyl chloride resin with an ordinary paste-forming PVC produced by an emulsion polymerization method or a homogeneous dispersion polymerization method in order to adjust the viscosity of the paste dispersion. This paste-blending vinyl chloride resin (to be referred to as a paste-blending PVC) should preferably be spherical single particles with a smooth surface in order to increase its effect of reducing the viscosity of the paste dispersion. Their effect is greater as its particle size becomes larger. Excessively large particle sizes, however, deteriorate various properties including transparency due to insufficient melting during processing, or cause sedimentation of the resin in the paste dispersion, etc. Thus, it should have an average particle diameter of 10 to 80 microns, preferably 20 to 60 microns, and its particle size distribution should not be too broad. Furthermore, for good strength and transparency of the product, the surfaces of the particles should be easily melted during processing and have affinity for the paste-forming PVC.

It is an object of this invention therefore to provide a paste-blending PVC having the aforesaid excellent properties.

The paste-blending PVC of the invention is produced by a process which comprises initiating suspension polymerization of a vinyl chloride monomer or a mixture of it with a monomer copolymerizable therewith in an aqueous medium in the presence of a water-soluble protein as a suspending agent, adding a proteolytic enzyme to the polymerization system at any point in a time period running from the time when the polymerization conversion reaches 10% by weight to the time when the polymerization reaction is not yet complete, and thereafter continuing the suspension polymerization until the polymerization reaction is completed.

A paste dispersion prepared from a paste-forming PVC and the paste-blending PVC of the invention has excellent viscosity properties, and can give processed articles having excellent properties, such as tensile strength, abrasion resistance, weatherbility and water resistance.

In the process of this invention, a water-soluble protein is used as the suspending agent. As stated hereinabove, PVC particles suitable for paste blending are preferably spherical single particles having an average particle diameter of 10 to 80 microns and possessing a smooth surface. For the production of such polymer particles, the use of a water-soluble protein as the suspending agent is advantageous. If the polymerization is used in the presence of other suspending agents, for example a partially saponified product of polyvinyl acetate, methyl cellulose and other polymeric suspending agents, the resulting polymer particles are irregularly shaped and porous with a number of suspended liquid droplets being agglomerated. Mixing of such polymer particles does not produce an appreciable effect of reducing the viscosity of the paste dispersion, and the viscosity of the paste dispersion varies greatly with time. In contrast, when a water-soluble protein is used as the suspending agent, single polymer particles having a smooth surface can be obtained. However, this does not lead to the formation of sufficiently uniform and spherical polymer particles. Vinyl chloride undergoes volume shrinkage when converted to a polymer by polymerization. If, however, a suspending agent having a strong protective power such as water-soluble proteins is used, the particle surfaces cannot follow volume shrinkage caused with the progress of the polymerization. Consequently, the shape of the particles changes with the progress of the polymerization reaction, and polymer particles obtained after the polymerization reaction are not completely spherical. These polymer particles, therefore, are not sufficient for reducing the viscosity of the paste dispersion. In addition, the protein skin remaining on the surface of the polymer particles reduces the affinity of the polymer particles for the plasticizer and paste-forming PVC, or the polymer particles are difficult to melt during processing. Accordingly, the resulting processed articles do not have entirely satisfactory properties.

The present inventors extensively worked on a method for removing this defect. As a result, they found a very simple and effective method in which the protein on the surface of the polymer is decomposed during the polymerization by adding a proteolytic enzyme.

Examples of the water-soluble proteins used in this invention include casein, albumin, fibroin, insulin, hemoglobin, gelatin, glue, hydrolyzates of proteins, and polycondensates of amino acids. The amount of the water-soluble protein slightly differs depending upon the polymerization conditions such as the polymerization temperature and the method and extent of agitation, or the particle size of the desired polymer. The suitable amount of the water-soluble protein is 0.02 to 2 parts by weight per 100 parts by weight of the monomers charged. In addition, for various purposes, other polymeric suspending agents, emulsifiers, plasticizers, may be used together in amounts which do not reduce the effects of the invention.

Since the water-soluble protein is an amphorteric electrolyte, the pH of the aqueous medium used for the polymerization should be properly adjusted in order to obtain the desired particle size.

Examples of the proteolytic enzyme used in this invention are pepsin, trypsin, chymotrypsin, cathepsin, papain, bromelin, pancreatin, ficin, proteolytic enzymes derived from microorganisms such as molds, yeasts, bacteria, etc. The amount of the proteolytic enzyme differs depending upon its type. Generally, it is 0.01 to 50% by weight, perferably 0.05 to 20% by weight, based on the weight of the water-soluble protein. In most cases, a sufficient effect can be obtained by using these proteolytic enzymes singly, but if desired, two or more of them may be used in combination.

Since an enzymatic reaction is generally affected markedly by such conditions as pH and temperature, it is necessary to select an enzyme which conforms to the conditions being used at the time of addition, or to adapt such conditions to the enzyme used.

In order to achieve the object of this invention, The proteolytic enzyme should be added after the polymerization conversion has reached 10% by weight, preferably 20% by weight. When it is added before the polymerization reaches 10% by weight, the polymerization system becomes unstable to form coarse particles which are undesirable for use as a paste-blending PVC. Needless to say, the addition of the proteolytic enzyme should be effected before the polymerization comes to completion. In order to obtain particles having a more spherical shape and increase their ability to reduce the viscosity of the paste dispersion, it is preferred to add the proteolytic enzyme before the polymerization conversion reaches 50% by weight.

The conditions normally used for suspension polymerization of vinyl chloride in the presence of a water-soluble protein can be applied as such to the polymerization in accordance with this invention. The polymerization temperature is usually set at 40° to 70° C. according to the desired degree of polymerization of the polymer.

Catalysts usually employed in the suspension polymerization of vinyl chloride can be used in the process of this invention. Examples include organic peroxides such as lauroyl peroxide, 3,5,5-trimethyl-hexanoyl peroxide, t-butyl peroxypivalate, diisopropyl peroxydicarbonate and acetylcyclohexylsulfonyl peroxide and azo compounds such as $\alpha,\alpha'$-azobisisobutyronitrile and $\alpha,\alpha'$-azobis-2,4-dimethylvaleronitrile. They may be used either singly or as a mixture of two or more.

Known conventional monomers can be used as the monomer copolymerizable with vinyl chloride in this invention. Typical examples of the comonomer include vinyl esters such as vinyl acetate and vinyl propionate; acrylic esters such as methyl acrylate and butyl acrylate; alkylacrylic esters such as methyl methacrylate and propyl ethacrylate; unsaturatd acids or the esters thereof, such as maleic anhydride, maleates and fumarates; vinyl ethers; vinyl halides such as vinyl bromide and vinyl fluoride; vinylidene halides such as vinylidene chloride, vinylidene bromide and vinylidene fluoride; aromatic vinyl compounds; acrylonitrile and methacrylonitrile; and $\alpha$-monoolefins such as ethylene, propylene, isobutylene and butene-1.

The process of this invention can also be applied when vinyl chloride or a mixture of it with a monomer copolymerizable therewith is graft-copolymerized in the presence of a polymer such as a vinyl acetate/ethylene copolymer.

The following examples illustrate the present invention more specifically. It should be understood that these examples do not in any way limit the scope of the present invention.

EXAMPLES 1 to 4 and COMPARATIVE EXAMPLES 1 and 2

Water (6 kg) containing 18 g of milk casein dissolved in it was charged into a 10-liter stainless steel autoclave equipped with stirring impellers, and the pH of the solution was adjusted to 10 with ammonia. Then, 3g of lauroyl peroxide was added. The autoclave was deaerated, and then 3 kg of vinyl chloride monomer was charged. Suspension polymerization of the vinyl chloride was started at 58° C., and when the polymerization conversion reached each of the values indicated in Table 1, bromelin as a proteolytic enzyme was added in each of the amounts indicated in Table 1. The polymerization was carried out until the polymerization conversion reached 90%. The unreacted monomer was recovered, and the resulting polymer slurry was dehydrated and dried. The average particle diameters and specific surface areas of the resulting polymer particles were as shown in Table 1.

A paste dispersion was prepared by blending 80 g of each of the polymer samples obtained with 120 g of paste-forming PVC having a degree of polymerization of 1800 produced by emulsion polymerization, 80 g of dioctyl phthalate and 4 g of a tin-containing stabilizer, and the viscosity of the paste dispersion was measured on the first day and at the end of seven days.

A paste dispersion prepared in the same way as above was heated at 200° C. for 2 minutes to form test samples, and the properties of the samples, were measured.

The results are shown in Table 1.

The properties were measured by the following method.
(1) Average particle diameter Measured by a sieve analysis using a wet method.
(2) Specific surface area Measured by the BET method using $N_2$ gas.
(3) Viscosity of the paste dispersion Measured at 25° C. using a B-type viscometer.
(4) Tensile test Conducted in accordance with JIS K-6723. The test samples had a thickness of 0.25 mm.
(5) Amount of abrasion
    Measured in acordance with JIS K-7204. The samples had a thickness of 1 mm. The load was 1,000 gt, and the number of testings was 3,000.

TABLE 1

|  | Comparative Example 1 | Comparative Example 2 | Example 1 | Example 2 | Example 3 | Example 4 |
|---|---|---|---|---|---|---|
| Polymerization conversion (%) at the time of adding the proteolytic enzyme | | 5 | 20 | 40 | 40 | 60 |
| Amount of the proteolytic enzyme added (mg) | 0 | 90 | 30 | 30 | 90 | 90 |
| Average particle diameter (microns) | 47 | Porous agglomerated coarse particles having an average particle diameter of 120 microns | 44 | 46 | 45 | 46 |
| Specific surface area (m²/g) | 7.1 | | 4.9 | 4.0 | 4.0 | 5.2 |
| Viscosity of the paste dispersion (*) First day | 6,100 | Not measured | 4,400 | 4,200 | 4,200 | 5,300 |
| Viscosity of the paste dispersion (*) At the end of 7 days | 11,000 | | 7,600 | 7,200 | 7,300 | 8,800 |
| Tensile strength (kg/mm²) | 1.4 | | 2.8 | 3.0 | 3.2 | 3.0 |
| Elongation (%) | 130 | | 280 | 300 | 300 | 290 |
| Amount of abrasion (mg) | 32 | | 20 | 22 | 19 | 21 |

(*) A paste dispersion prepared from 200 g of paste-forming PVC having a degree of polymerization of 1,800, 80 g of dioctyl phthalate and 4 g of a tin-containing stabilizer had a viscosity of 23,000 centipoises on the first day and 96,500 centipoises at the end of 7 days.

The results given in Table 1 demonstrate that the paste-blending vinyl chloride resins obtained in Examples 1 to 3 had a lower specific surface area than those obtained in Comparative Examples 1 and 2, and that the paste dispersions containing these paste-blending vinyl chloride resins had a lower viscosity and gave products having better properties such as tensile strength and abrasion resistance than those prepared from the paste-blending vinyl chloride resins obtained in Comparative Examples 1 and 2.

EXAMPLES 5 TO 7 AND COMPARATIVE EXAMPLE 3

Water (6 kg) containing 24 g of gelatin (4th grade specified in JIS K-6503) dissolved therein was added to the same autoclave as used in Example 1, and the pH of the solution was adjusted to 9 with sodium acetate. Then, 3 g of azobisisobutyronitrile was charged, and the autoclave was deaerated. The autoclave was then charged with 150 g of vinyl acetate and 2.85 kg of vinyl chloride, and the suspension polymerization of these monomers was started at 55° C. When the polymerization conversion reached each of the values given in Table 2, papain as a proteolytic enzyme was added in each of the amounts indicated in Table 2. The polymerization was then continued until the polymerization conversion reached 90%. The unreacted monomer was recovered, and the resulting polymer slurry was dehydrated and dried.

The average particle diameters and specific surface areas of the resulting polymers were as shown in Table 2. The propeties of paste dispersions prepared by using these polymer samples were measured in the same way as in Example 1, and the results are shown in Table 2.

It is seen from the results given in Table 2 that the polymer samples obtained in Examples 5 to 7 had a very good quality for use as a paste-blending PVC.

TABLE 2

|  | Example 5 | Example 6 | Example 7 | Comparative Example 3 |
|---|---|---|---|---|
| Polymerization conversion (%) at the time of adding the proteolytic enzyme | 30 | 30 | 70 | |
| Amount of the proteolytic enzyme added (mg) | 60 | 300 | 300 | 0 |
| Average particle diameter (microns) | 36 | 36 | 37 | 38 |
| Specific surface area (m²/g) | 4.6 | 4.7 | 4.5 | 8.7 |
| Viscosity of the paste dispersion first day | 5200 | 5000 | 6200 | 7600 |
| Viscosity of the paste dispersion at the end of 7 days | 8300 | 8100 | 9800 | 13700 |
| Tensile strength (kg/mm²) | 2.8 | 2.8 | 2.7 | 1.2 |
| Elongation (%) | 400 | 440 | 420 | 150 |
| Amount of abrasion (mg) | 24 | 20 | 22 | 35 |

What we claim is:

1. A process for producing a paste-blending vinyl chloride resin, which comprises
    initiating suspension polymerization of a vinyl chloride monomer or a mixture of it with a monomer copolymerizable therewith in an aqueous medium in the presence of a water-soluble protein as a suspending agent;
    adding a proteolytic enzyme to the polymerization system at any point in a time period running from the time when the polymerization conversion reaches 10% by weight to the time when the polymerization reaction is not yet complete; and
    thereafter continuing the suspension polymerization until the polymerization reaction is completed.

2. The process of claim 1 wherein said water-soluble protein is selected from the group consisting of casein, albumin, fibroin, insulin, hemoglobin, gelatin, glue, hydrolyzates of proteins, and polycondensates of amino acids.

3. The process of claim 1 wherein said water-soluble protein is casein or gelatin.

4. The process of claim 1 wherein the amount of said water-soluble protein is 0.02 to 2 parts by weight per 100 parts by weight of said monomer or monomeric mixtures.

5. The process of claim 1 wherein said proteolytic enzyme is selected from the group consisting of pepsin, trypsin, chymotrypsin, cathepsin, papain, bromelin, pancreatin, ficin and proteolytic enzymes derived from microorganisms.

6. The process of claim 1 wherein said proteolytic enzyme is bromelin or papain.

7. The process of claim 1 wherein the amount of said proteolytic enzyme is 0.01 to 50% by weight based on the weight of the water-soluble protein.

8. The process of claim 1 wherein the proteolytic enzyme is added after the polymerization conversion has reached 20% by weight.

9. The process of claim 1 wherein the polymerization is carried out at 40° to 70° C.

10. The process of claim 1 or claim 8 wherein the proteolytic enzyme is added before the polymerization conversion reaches 50% by weight.